United States Patent [19]

Feilhauer et al.

[11] Patent Number: 4,798,442

[45] Date of Patent: Jan. 17, 1989

[54] METHOD OF ALIGNING TWO OPTICAL FIBER ENDS FOR FRONTAL CONTACT

[75] Inventors: Helmut Feilhauer, Urach; Josef Steimle, Allmersbach i.T., both of Fed. Rep. of Germany

[73] Assignee: ANT Nachrichtentechnik GmbH, Backnang, Fed. Rep. of Germany

[21] Appl. No.: 72,704

[22] Filed: Jul. 13, 1987

[30] Foreign Application Priority Data

Jul. 12, 1986 [DE] Fed. Rep. of Germany ....... 3623619

[51] Int. Cl.$^4$ .............................................. G02B 6/36
[52] U.S. Cl. ................................................ 350/96.21
[58] Field of Search ................ 350/96.21, 96.20, 96.15

[56] References Cited

U.S. PATENT DOCUMENTS 4,664,732  5/1987  Campbell et al. ................. 350/96.21
4,735,481  4/1988  Lukas et al. ...................... 350/96.20

FOREIGN PATENT DOCUMENTS 0030108   6/1981  European Pat. Off. .
0210003   1/1987  European Pat. Off. .
3429862  11/1985  Fed. Rep. of Germany .
3514647  10/1986  Fed. Rep. of Germany .

OTHER PUBLICATIONS

Reinhold Engel, "Lichtwellenleiter Verschweissen–Automatisch, Schnell und Prazise", Telecom Report, vol. 9, No. 3, May/Jun. 1986, pp. 197-201.
Yasunori Yuki et al., "Single-Mode Optical Fiber Cable Route Construction Technique", Japan Telecommunications Review, vol. 25, No. 3, Jul. 1983, pp. 191-197.

*Primary Examiner*—James W. Davie
*Attorney, Agent, or Firm*—Spencer & Frank

[57] ABSTRACT

A method of aligning two optical fiber ends so that they abut at their frontal faces and light that is fed into one of the two optical fibers is coupled over into the other optical fiber with the least amount of attenuation. A manipulator moves the optical fiber end it holds stepwise in the direction of its longitudinal axis (z) toward the other fiber end and after each step the manipulator is displaced transversely. The change in the coupled-over light power (P) is recorded as a function of transverse displacement and the displacement of the manipulator in the longitudinal direction is stopped as soon as a position ($z_0$) is reached in which transverse displacement of the manipulator no longer produces a change in the coupled-over lightpower (P).

3 Claims, 2 Drawing Sheets

METHOD OF ALIGNING TWO OPTICAL FIBER ENDS FOR FRONTAL CONTACT

BACKGROUND OF THE INVENTION

1. Field of the Invention

The present invention relates to a method of aligning two optical fiber ends so that they abut at their frontal faces and light fed into one of the two optical fibers is coupled over to the other optical fiber with the least amount of attenuation. In this method, one optical fiber end is displaced by means of a manipulator in at least one direction transverse to its longitudinal axis until a position is found in which the light power coupled over to the other optical fiber has reached a maximum.

2. Description of the Prior Art

A method of aligning two optical fiber ends is disclosed, for example, in German Pat No. 3,429,862. In this reference, the method is employed during the welding together of the two optical fiber ends to produce a splice with the lowest possible attenuation.

SUMMARY OF THE INVENTION

It is an object of the present invention to provide a method where two optical fiber ends can be aligned with one another in such a manner that the light can be coupled between them with the lowest attenuation possible.

It is a further object of the invention to provide a method where the fiber ends can be aligned automatically.

The above and other objects are accomplished according to the invention by the provision of a method of aligning the ends of two optical fibers so that light which is fed into one of the two optical fibers is coupled over to the other optical fiber with a minimum amount of attenuation, one optical fiber end being displaced by means of a manipulator in at least one direction transverse to a longitudinal axis of the two optical fibers until a position is located where a coupled-over light power (P) from one fiber to the other fiber is maximized. The method includes moving one optical fiber end, held in the manipulator, in a longitudinal direction, in a plurality of steps toward the other fiber end; transversely displacing the manipulator after each step; recording a change in the coupled-over light power (P) as a function of transverse displacement after each step; and stopping displacement of the manipulator in the longitudinal direction as soon as the fiber ends reach a relative longitudinal position ($z_0$) in which further transverse displacement of the manipulator produces no change in the coupled-over light power (P).

The splicing of monomode optical fibers in particular requires especially accurate alignment of the fiber ends not only in the transverse direction but also with respect to the spacing of their frontal faces. Therefore, the optical fiber ends should, on the one hand, be aligned transversely in such a manner that their optical axes coincide as best as possible and, on the other hand, they should be aligned longitudinally so that their frontal faces abut.

BRIEF DESCRIPTION OF THE DRAWING

The invention may be better understood by referring to the detailed description of the invention when taken in conjunction with the accompanying drawing in which.

DESCRIPTION OF THE PREFERRED EMBODIMENTS

Figure 1:
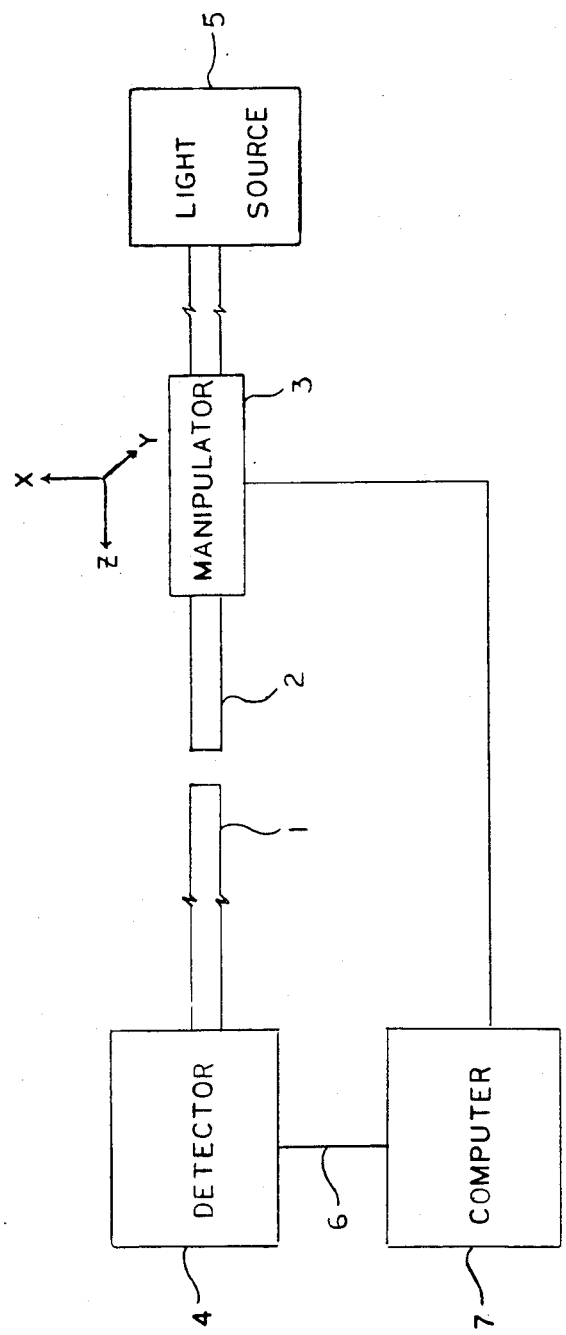
FIG. 1 shows a schematic representation of the apparatus for performing the method of the instant invention.

FIG. 1 shows two optical fibers 1, 2 which are to be welded together, for example, in a splicer, that are initially fixed in elements in such a manner that their frontal faces face one another and their longitudinal axis are parallel to one another. One of the two holding elements is configured as a manipulator 3 able to move in two orthogonal directions (x and y) transversely to the longitudinal axis and in a longitudinal direction (z) parallel to the longitudinal axis of the optical fiber held in the manipulator 3.

Figure 2:
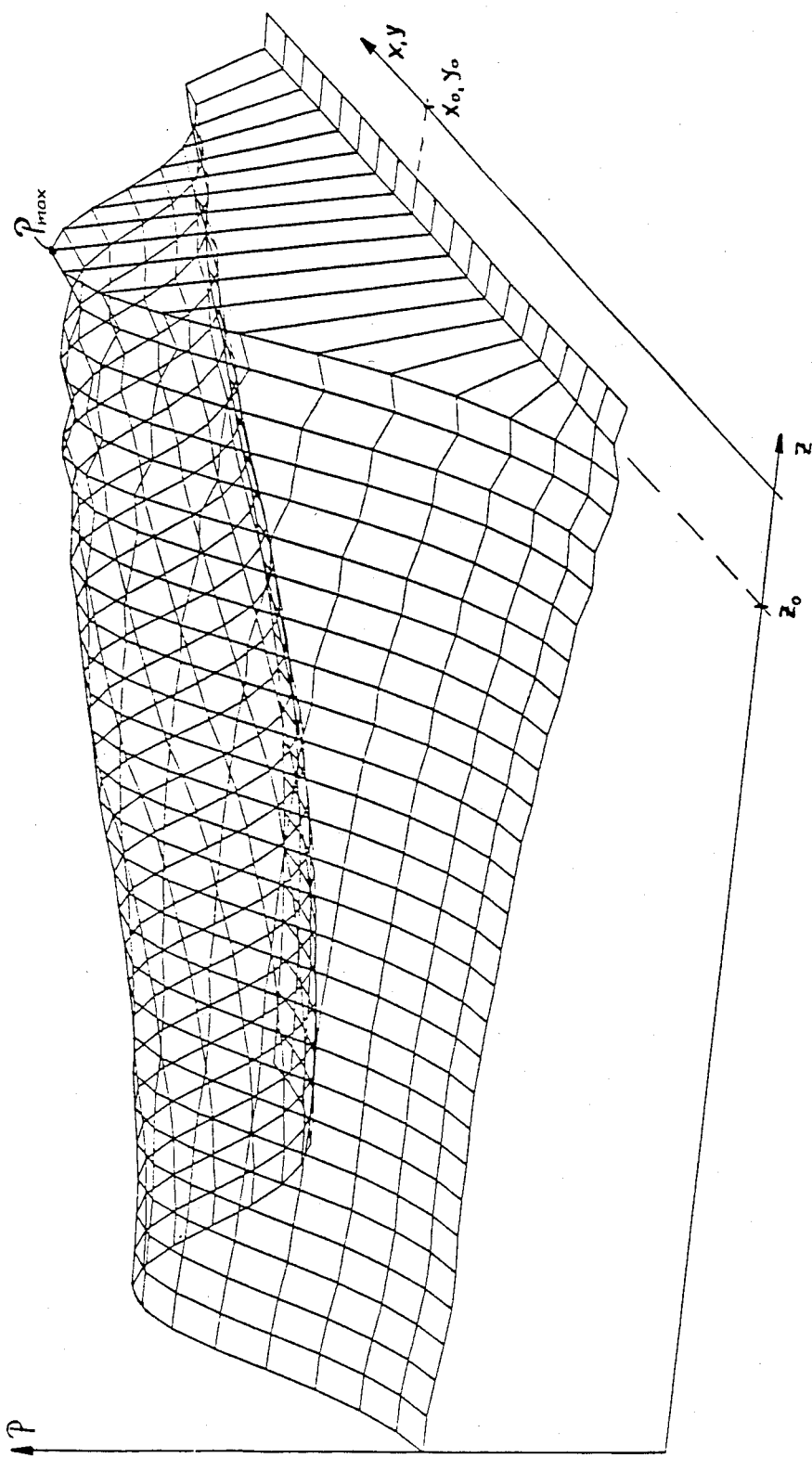
FIG. 2 shows measuring curves recorded of the light power coupled from one optical fiber to the other.

The manipulator 3 advances in steps in the z direction, i.e. in the direction of the longitudinal axis of the optical fiber held therein, toward the frontal face of the other optical fiber. After each displacement step in the z direction, the manipulator performs transverse movements in the mutually perpendicularly oriented x and y directions. The path by which the manipulator is displaced transversely is here shorter than the fiber diameter. During each transverse displacement, a measurement is taken by detector 4 of the percentage of the light power fed into one optical fiber 2 from light source 5 and coupled through the point of separation into the other optical fiber 1. The detected signal is then fed through line 6 from detector 4 to the computer 7. In FIG. 2, this coupled-over light power percentage P is plotted for each displacement step in the z direction as a function of the transverse displacement in the x and/or y directions. This results in measurement curves extending perpendicularly to the z axis and in the direction of the x and y axes, all curves having a maximum. This maximum of coupled-over light power appears each time at a position during the transverse displacement where the optical axes of the two optical fibers happen to coincide.

A displacement of the manipulator 3 in the z direction is stopped as soon as a position $z_0$ has been reached in which, during transverse displacement of the manipulator 3, no further change of the coupled-over light power is measured. In this position, the two optical fiber ends abut at their frontal faces and lock themselves together so that a transverse displacement no longer permits relative movement of the frontal face of one fiber with respect to the other. In the position at coordinate $z_0$, the measured coupled-over light power P thus has a linear shape. This coordinate $z_0$ is stored because it indicates to the manipulator at which location in the longitudinal direction the frontal faces of the two optical fibers 1, 2 contact one another.

Once coordinate $z_0$ has been determined, the manipulator 3 moves back a step in the longitudinal direction to bring the two optical fiber ends into a position in which they do not contact one another. The manipulator 3 now searches out that position $x_0$, $y_0$ in each of the two transverse directions (x and y) in which there appears a maximum coupled-over light power $p_{max}$. In the located optimum $x_0$, $y_0$ position, the manipulator then moves again to the position for which the coordinate $z_0$ has been stored. Thus the manipulator is positioned at the final location ($x_0$, $y_0$, $z_0$). This completes the alignment of the two optical fibers 1, 2 and the splicing process can begin.

The method step of retracting from position $z_0$ to locate the optimum $x_0$, $y_0$ position may be omitted if the manipulator 3 advances in the longitudinal direction from the respective $x_0$, $y_0$ position in which the coupled-over light power P is a maximum. Here the manipulator 3 is already in the optimum $x_0$, $y_0$ position when it reaches the longitudinal displacement position $z_0$.

The evaluation of the measured coupled-over light power as a function of transverse displacement, storage of coordinate $z_0$ and control of the manipulator is advantageously performed by the computer 7.

Between 50 and 70 displacement steps in the longitudinal direction are performed to reach the $z_0$ position. And each longitudinal step has a magnitude of 0.5 µm–1.5 µm.

Two different measurements are taken during each transverse displacement for each step longitudinally and the distance between the two positions where these measurements are taken is 5 µm–8 µm. After the coordinate $z_0$ has been determined five different measurements are taken during the transverse displacement for searching the position $x_0$, $y_0$ in which there appears a maximum coupled-over light power $P_{max}$. The distance between each two successive positions where measurements are taken is 0.2 µm–0.4 µm.

It will be understood that the above description of the present invention is susceptible to various modifications, changes and adaptations, and the same are intended to be comprehended within the meaning and range of equivalents of the appended claims.

What is claimed is:

1. A method of aligning the ends of two optical fibers so that light which is fed into one of the two optical fibers is coupled over to the other optical fiber with a minimum amount of attenuation, one optical fiber end being displaced by means of a manipulator in at least one direction transverse to a longitudinal axis of the two optical fibers until a position is located where a coupled-over light power (P) from one fiber to the other fiber is maximized, comprising the steps of:

(a) moving the manipulator parallel to the longitudinal axis, in a plurality of steps to move the end of the one fiber toward the end of the other fiber;
    (b) transversely displacing the manipulator after each step;
    (c) recording a change in the coupled-over light power (P) as a function of transverse displacement after each step; and
    (d) stopping displacement of the manipulator in the longitudinal direction as soon as the fiber ends reach a relative longitudinal position ($z_0$) in which further transverse displacement of the manipulator produces nearly no change in the coupled-over light power (P).

2. A method of aligning two optical fiber ends according to claim 1, which further comprises the steps of:

(e) storing a representation of the relative longitudinal position ($z_0$) corresponding to said step of stopping;
    (f) moving the manipulator parallel to the longitudinal axis until the two optical fiber ends are no longer in contact with one another;
    (g) moving the one optical fiber to bring its end to a transverse position ($x_0$, $y_0$) where the coupled-over light power ($p_{max}$) is maximized; and
    (h) displacing the fiber end in the direction of the longitudinal axis such that the manipulator is positioned at a final location ($x_0$, $y_0$, $z_0$) constituted by the transverse position achieved in said step (g) and the longitudinal position achieved in said step (d).

3. A method of aligning two optical fiber ends according to claim 1, wherein before said step of stopping, said step of transversely displacing is carried out to bring the fiber end to a position at which a maximum of the coupled-over light power exists.

* * * * *